United States Patent [19]

Watanabe

[11] Patent Number: 5,485,806
[45] Date of Patent: Jan. 23, 1996

[54] MOATED PET FOOD TRAY

[76] Inventor: Masayuki Watanabe, P.O. Box 265194, Daytona Beach, Fla. 32126-5194

[21] Appl. No.: 318,571

[22] Filed: Sep. 26, 1994

[51] Int. Cl.⁶ .............................. A01K 5/01; A01K 7/00
[52] U.S. Cl. ...................................................... 119/51.5
[58] Field of Search ...................... 119/51.5, 61, 18

[56] References Cited

U.S. PATENT DOCUMENTS

| | | | |
|---|---|---|---|
| 2,677,350 | 5/1954 | Prestidge et al. | 119/61 |
| 4,357,905 | 11/1982 | Carpenter | 119/61 |
| 4,896,627 | 1/1990 | Riddell | 119/61 |
| 5,125,363 | 6/1992 | McGaha | 119/51.5 |
| 5,245,948 | 9/1993 | McClellan | 119/61 X |

*Primary Examiner*—Thomas Price

[57] ABSTRACT

A pet food tray for preventing insect contact with food positioned within the tray. The inventive device includes a main body having a divider plate extending thereacross to separate the main body into a water cavity and a moat cavity. A food bowl is concentrically positioned within the moat cavity such that insects are separated from contact with the food by a liquid moat. A transfer hole permits fluid communication between the moat cavity and the water cavity through the divider plate while simultaneously preventing a transfer of deceased insects therebetween.

3 Claims, 2 Drawing Sheets

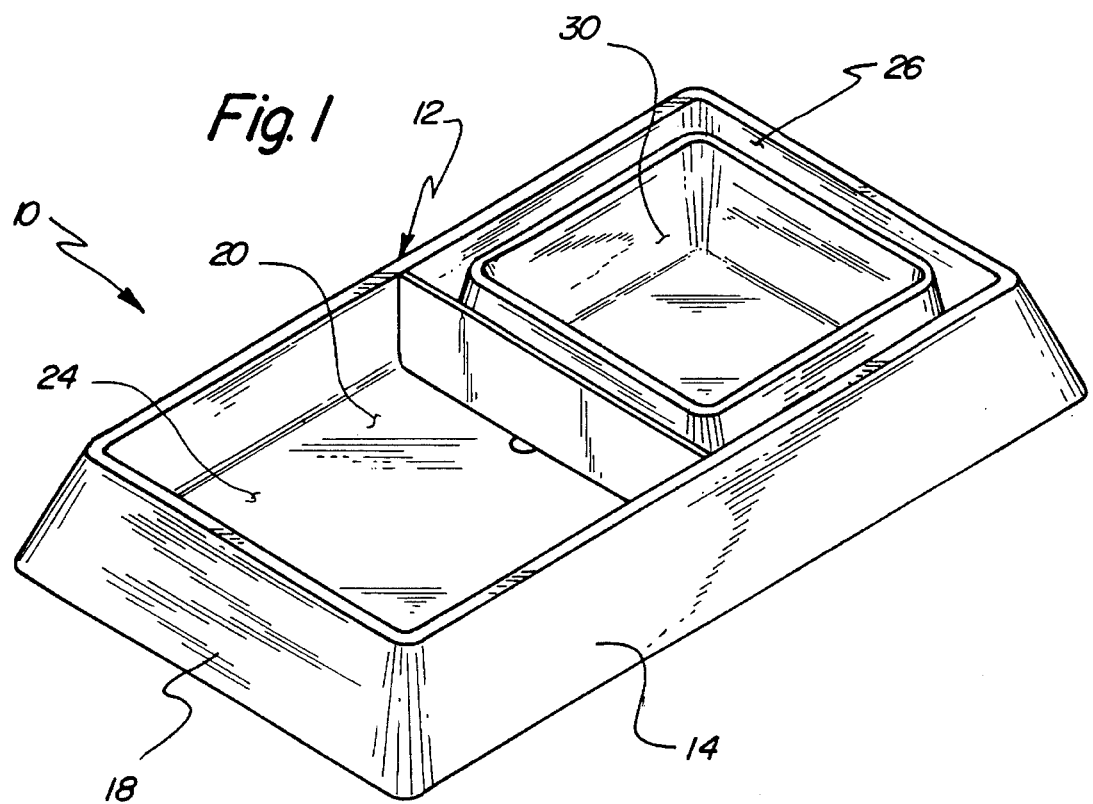
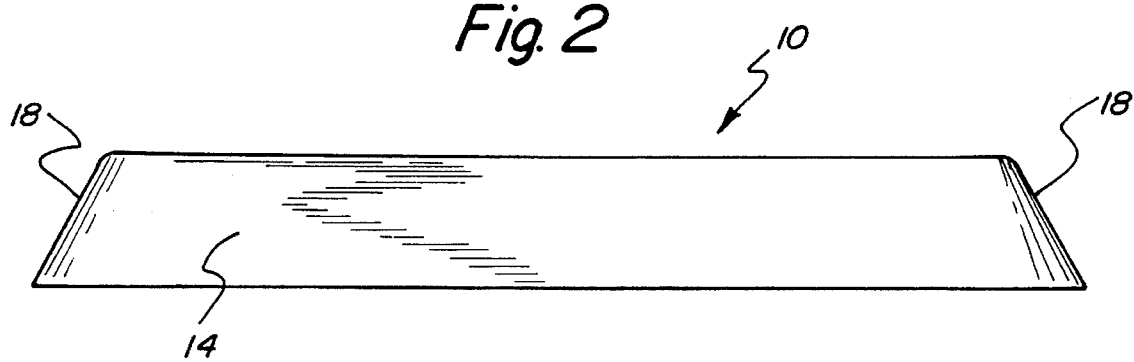

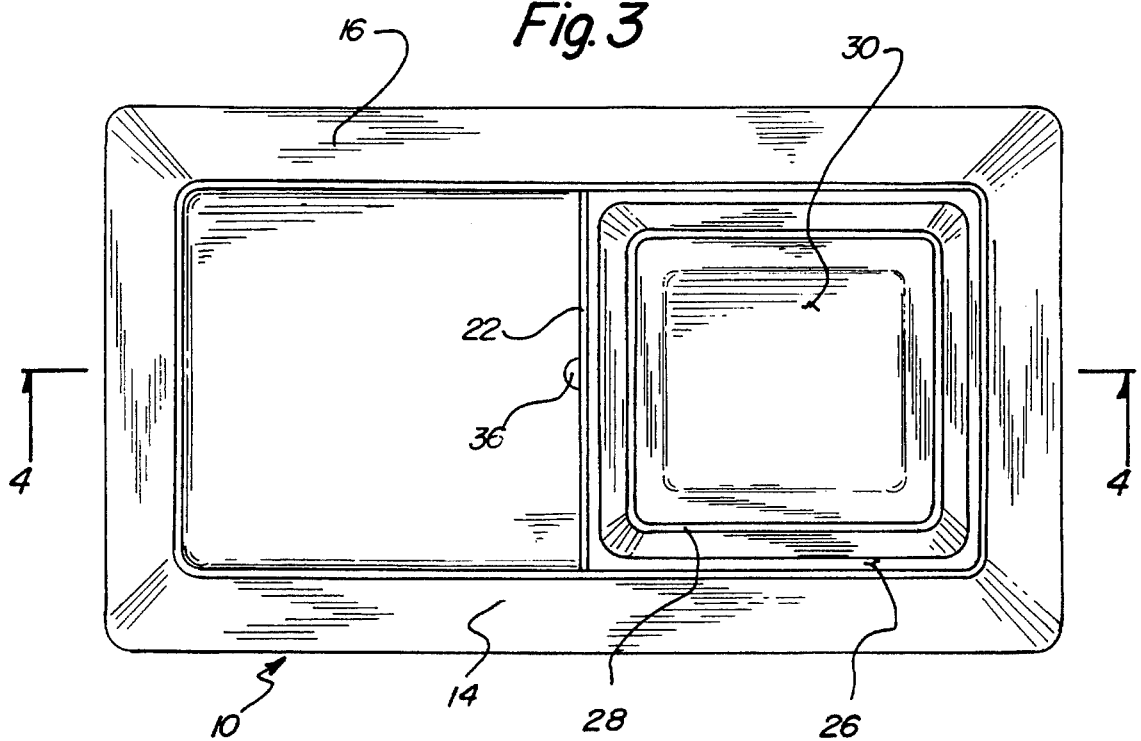
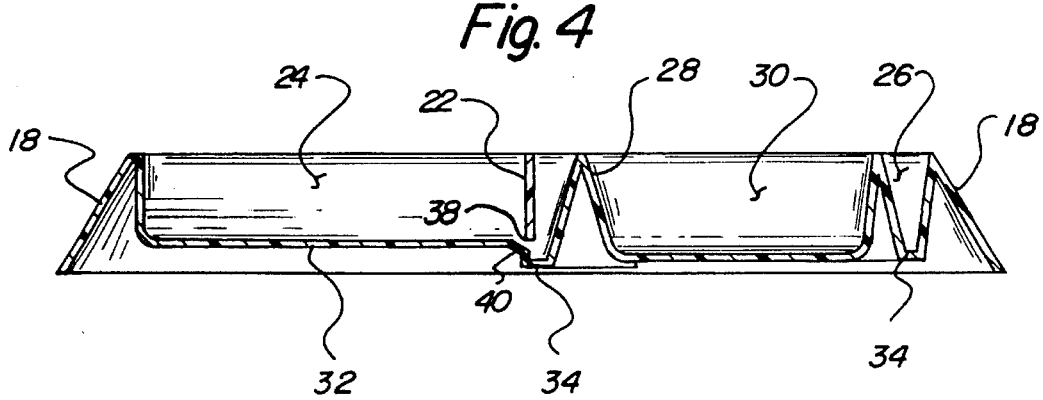

MOATED PET FOOD TRAY

BACKGROUND OF THE INVENTION

1. Field of the Invention

The present invention relates to animal food containers and more particularly pertains to a moated pet food tray for preventing insect contact with food positioned within the tray.

2. Description of the Prior Art

The use of animal food containers is known in the prior art. More specifically, animal food containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art animal food containers include U.S. Pat. Nos. 5,245,948; 5,069,166; 5,117,778; 5,113,798; and 5,205,242.

While these devices fulfill their respective, particular objectives and requirements, the aforementioned patents do not disclose a pet food tray for preventing insect food contact with food positioned within the tray which includes a main body having a divider plate extending thereacross to separate the main body into a water cavity and a moat cavity, and a food bowl concentrically positioned within the moat cavity such that insects are separated from contact with the food by a fluid moat, wherein a transfer hole directed through the divider plates permits fluid communication between the moat cavity and the water cavity while simultaneously preventing a transfer of deceased insects therebetween.

In these respects, the moated pet food tray according to the present invention substantially departs from the conventional concepts and designs of the prior art, and in so doing provides an apparatus primarily developed for the purpose of preventing insect contact with food positioned within the tray.

SUMMARY OF THE INVENTION

In view of the foregoing disadvantages inherent in the known types of animal food containers now present in the prior art, the present invention provides a new moated pet food tray construction wherein the same can be utilized for preventing insect contact with food positioned within the tray. As such, the general purpose of the present invention, which will be described subsequently in greater detail, is to provide a new moated pet food tray apparatus and method which has many of the advantages of the animal food containers mentioned heretofore and many novel features that result in a moated pet food tray which is not anticipated, rendered obvious, suggested, or even implied by any of the prior art animal food containers, either alone or in any combination thereof.

To attain this, the present invention generally comprises a pet food tray for preventing insect contact with food positioned within the tray. The inventive device includes a main body having a divider plate extending thereacross to separate the main body into a water cavity and a moat cavity. A food bowl is concentrically positioned within the moat cavity such that insects are separated from contact with the food by a liquid moat. A transfer hole permits fluid communication between the moat cavity and the water cavity through the divider plate while simultaneously preventing a transfer of deceased insects therebetween.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, method is and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new moated pet food tray apparatus and method which has many of the advantages of the animal food containers mentioned heretofore and many novel features that result in a moated pet food tray which is not anticipated, rendered obvious, suggested, or even implied by any of the prior art animal food containers, either alone or in any combination thereof.

It is another object of the present invention to provide a new moated pet food tray which may be easily and efficiently manufactured and marketed.

It is a further object of the present invention to provide a new moated pet food tray which is of a durable and reliable construction.

An even further object of the present invention is to provide a new moated pet food tray which is susceptible of a low cost of manufacture with regard to both materials and labor, and which accordingly is then susceptible of low prices of sale to the consuming public, thereby making such moated pet food trays economically available to the buying public.

Still yet another object of the present invention is to provide a new moated pet food tray which provides in the apparatuses and methods of the prior art some of the advantages thereof, while simultaneously overcoming some of the disadvantages normally associated therewith.

Still another object of the present invention is to provide a new moated pet food tray for preventing insect contact with food positioned within the tray.

Yet another object of the present invention is to provide a new moated pet food tray which includes a main body having a divider plate extending thereacross to separate the main body into a water cavity and a moat cavity, and a food bowl concentrically positioned within the moat cavity such that insects are separated from contact with the food by a fluid moat, wherein a transfer hole directed through the divider plates permits fluid communication between the moat cavity and the water cavity while simultaneously preventing a transfer of deceased insects therebetween.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a moated pet food tray according to the present invention.

FIG. 2 is a front elevation view thereof.

FIG. 3 is a top plan view of the moated pet food tray.

FIG. 4 is a cross sectional view taken along line 4—4 of FIG. 3.

DESCRIPTION OF THE PREFERRED EMBODIMENT

With reference now to the drawings, and in particular to FIGS. 1–4 thereof, a new moated pet food tray embodying the principles and concepts of the present invention and generally designated by the reference numeral 10 will be described.

More specifically, it will be noted that the moated pet food tray 10 comprises a substantially rectangular main body 12 having a front wall 14 spaced from a rear wall 16, as well as an opposed pair of side walls 18. The walls 14–18 are preferably oriented at an oblique angle relative to a vertical axis such that tipping of the tray 10 by a pet or the like is substantially less likely to occur. The main body 12 is shaped so as to define a central cavity 20 which is separated by a divider wall 22 to define a water cavity 24 on a first side of the divider wall and a moat cavity 26 on a second side of the divider wall. The divider wall 22 is preferably removably positioned across the central cavity 20 of the main body 12 and retained as shown in FIGS. 1 and 3 by a frictional engagement with the main body.

As best illustrated in FIGS. 3 and 4 of the drawings, a food bowl 28 is concentrically positioned within the moat cavity 26 and includes a food cavity 30 within which food or other consumable substances can be positioned. Because the food bowl 28 is concentrically positioned within the moat cavity 26, the food cavity 30 is separated from the main body 12 by a moat, wherein the moat prevents insects, such as crawling bugs or the like, from traversing the moat and gaining contact with the food contained within the food cavity.

With reference to FIG. 4, it can be shown that the moated pet food tray 10 includes a water cavity floor 32 which is positioned a first distance from a ground surface upon which the moated pet food tray is residing. Further, the moat cavity 26 includes a moat cavity floor 34 which is positioned a second distance from the ground surface upon which the moated pet food tray 10 is residing. Preferably, the first distance of the water cavity floor 32 from the ground surface is substantially greater than the second distance of the moat cavity floor 34 from the ground surface, as best illustrated in FIG. 4. The pet food tray 10 additionally includes a transfer hole 36 which permits fluid communication between the moat cavity 26 and the water cavity 24. The transfer hole 36 is defined by a lower edge 38 of the divider wall 22 which extends across an arcuate surface 40 extending between the water cavity 24 and the moat cavity 26 which integrally connects the water cavity floor 32 to the moat cavity floor 34. By this structure, water positioned within the water cavity 24 will fill the moat cavity 26 to an equal level on both sides of the divider wall 22. Insects and bugs will then be precluded from access to the food cavity 30 by the moat formed within the moat cavity 26 when water is present in the device 10 as described. Further, the divider wall 22 will preclude transfer of any deceased insects or bugs from the moat cavity 26 to the water cavity 24, thereby ensuring that the water within the water cavity 24 is free of bugs and other debris. Because the lower edge 38 of the divider wall 22 is positioned in line with an upper surface of the water cavity floor 32, a transfer of floating deceased bugs or other debris through the transfer hole 36 is precluded when water or other fluid is present within the water cavity 24. However, even when the water or other fluid residing within the water cavity 24 is consumed by a pet or the like, it is not possible for the fluid residing within moat cavity 26 to be exhausted by such consumption. Thus, the positioning of the water cavity floor 32 at the first distance from the ground surface which is greater than the second distance of the moat cavity floor 34 from the ground surface permits the fluid within the water cavity 24 to be fully consumed without drying out the moat cavity 26.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A moated pet food tray comprising:

a main body having a front wall spaced from a rear wall, and an opposed pair of side walls, said main body being shaped so as to define a central cavity;

a divider wall extending across said central cavity to define a water cavity on a first side of said divider wall and a moat cavity on a second side of said divider wall;

and, a food bowl concentrically positioned within said moat cavity, said food bowl including a food cavity within which food can be positioned, said main body includes a water cavity floor positioned a first distance from a ground surface upon which said moated pet food tray resides, and a moat cavity floor positioned a second distance from said ground surface, said main body further includes a transfer hole permitting fluid communication between said moat cavity and said water cavity, said transfer hole being defined by a lower edge of said divider wall extending across an arcuate surface of said main body located between said water cavity and said moat cavity, said arcuate surface integrally connecting said water cavity floor to said moat cavity floor, wherein water positioned within said water cavity will enter said moat cavity through said transfer hole to an equal level on both said of said divider wall.

2. The moated pet food tray of claim 1, wherein said walls are oriented at an oblique angle relative to a vertical axis such that tipping of said tray by a pet is reduced.

3. A moated pet food tray comprising:

a main body having a front wall spaced from a rear wall, and an opposed pair of side walls, said walls being oriented at an oblique angle relative to a vertical axis such that tipping of said tray by a pet is reduced, said main body being shaped so as to define a central cavity, said main body including a water cavity floor positioned a first distance from a ground surface upon which said moated pet food tray resides, and a moat cavity floor positioned a second distance from said ground surface, wherein said first distance of said water cavity floor from said ground surface is substantially greater than said second distance of said moat cavity floor from said ground surface;

a divider wall removably positioned across said central cavity of said main body and retained thereacross by a frictional engagement with said main body, said divider wall extending across said central cavity to define a water cavity on a first side of said divider wall and a moat cavity on a second side of said divider wall, wherein said main body further includes a transfer hole permitting fluid communication between said moat cavity and said water cavity, said transfer hole being defined by a lower edge of said divider wall extending across an arcuate surface of said main body located between said water cavity and said moat cavity, said arcuate surface integrally connecting said water cavity floor to said moat cavity floor, wherein water positioned within said water cavity will enter said moat cavity through said transfer hole to an equal level on both sides of said divider wall;

and, a food bowl concentrically positioned within said moat cavity, said food bowl including a food cavity within which food can be positioned.

* * * * *